Z. C. Steele.
Horse Rake

Patented May 17, 1870

Witnesses.
Villette Anderson,
Chas Kenyon

Inventor
Z. C. Steele,
Chipman Hosmer & Co.
Attorneys

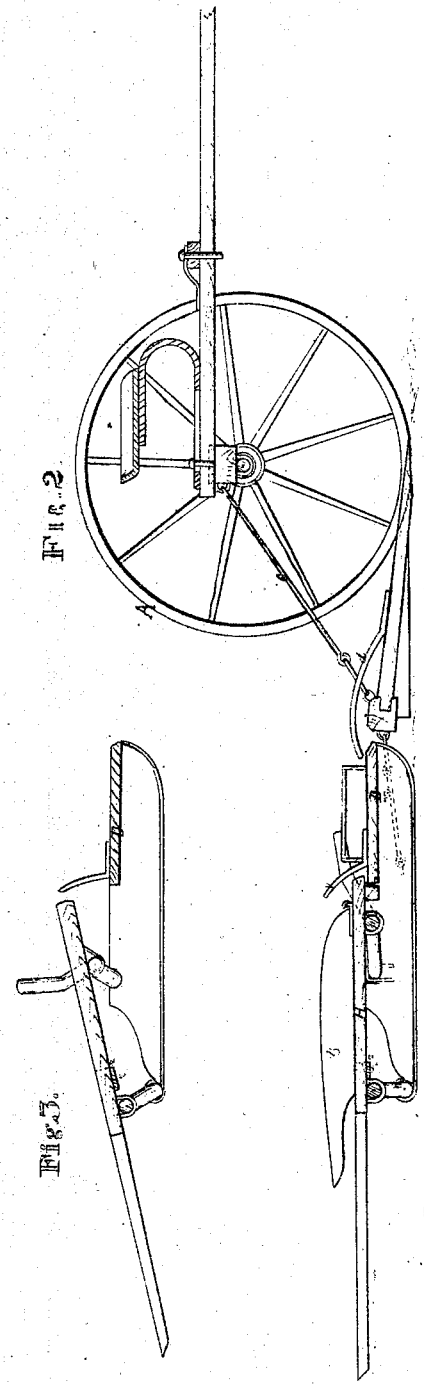

United States Patent Office.

ZATTEE CUSHING STEELE, OF PANA, ILLINOIS.

Letters Patent No. 103,099, dated May 17, 1870.

IMPROVEMENT IN MACHINES FOR RAKING AND COCKING HAY.

The Schedule referred to in these Letters Patent and making part of the same.

*To all whom it may concern:*

Be it known that I, ZATTEE CUSHING STEELE, of Pana, in the county of Christian and State of Illinois, have invented a new and valuable Improvement in Combined Hay-Rake and Cocker; and I do hereby declare that the following is a full, clear, and exact description of the construction and operation of the same, reference being had to the annexed drawings making a part of this specification, and to the letters and figures of reference marked thereon.

Figure 1, of the drawings, is a plan view of my invention.

Figure 2 is a longitudinal section of the same.

Figure 3 is a detail.

Figure 1:
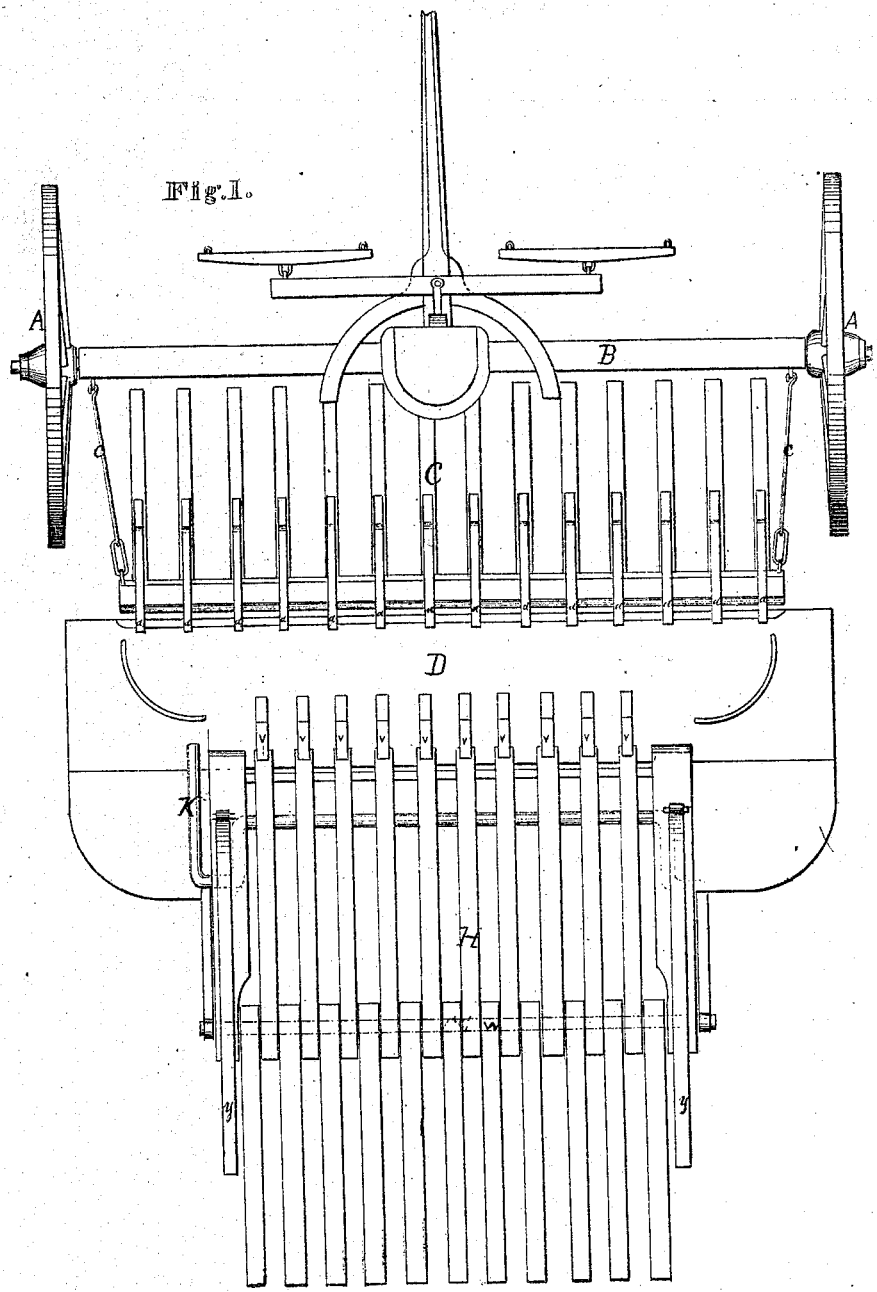

My invention relates to means for gathering and securing hay, and consists in the construction and arrangement of a novel apparatus intended to give efficient aid in the branch of agriculture mentioned, and by the use of which teddered hay may be easily raked and formed into cocks.

A, of the drawings, represent the wheels and B the axle of my carriage.

To the above-described carriage I attach the horse-rake C, by means of the rods c, as shown on figure 1.

Upon the rear end of the teeth of my rake I attach, respectively, the springs marked d.

These springs serve as rests for the platform D, next mentioned, and also as guides for the hay onto said platform.

D is a platform, attached to the rear cross-bar or head of the rake, in the manner shown on fig. 2, by means of the connecting-rods n.

Upon this platform I arrange the springs v and the guards y, for the purposes hereinafter mentioned.

H represents a jointed delivering-platform, constructed as follows, to wit:

I place a series of fingers or slats side by side, in the manner shown on fig. 1, so that their respective ends shall lap each other, as therein represented, and pass a rod, W, through the whole, thereby forming a complete joint near the middle of the platform.

A small iron plate, $z$, serves to keep the fingers of the rear section in place, and a similar strip, under the heads of the fingers of the other section, performs a similar duty for that section also.

K is an elbow-lever, the main shaft of which passes under all the fingers of the upper or front section of the platform, the bent upright part of which serving as a hand-lever for operating the device.

The springs $v$ serve as stops for the movements of the front section of the jointed platform, and also as guides for the hay approaching thereto. The office of the guards $y$ is to prevent the hay from falling from the ends of the platform D.

My apparatus is operated as follows, namely:

The rake is drawn forward into the hay, which receives it upon its teeth, from whence it is conducted, by the pressure it receives, up the springs $d$ and onto the platform D. A man stands upon each end of this platform with a hay-fork, and, as soon as they deem platform D sufficiently loaded, they put their forks into the load, at each end, and top it rearward upon the jointed platform H. This process is repeated until the operators find there is hay enough on platform H to form a cock, when the man next the upright end of lever K takes hold thereof and raises the rear end of the platform. By lifting said lever, the hay is deposited in a pile, and the work is completed.

I claim as my invention—

The combined hay-rake and cocker, herein described, having rake C and platforms D and H, when constructed substantially as specified.

In testimony that I claim the above, I have hereunto subscribed my name in the presence of two witnesses.

ZATTEE CUSHING STEELE.

Witnesses:
W. H. TOPPING,
O. R. COWGILL.